United States Patent [19]
Selby et al.

[11] Patent Number: 6,038,038
[45] Date of Patent: Mar. 14, 2000

[54] METHOD FOR DETERMINING OFFSET AND GAIN CORRECTION FOR A LIGHT SENSITIVE SENSOR

[75] Inventors: Bart D. Selby, Walworth; Thomas R. Beikirch, Webster, both of N.Y.

[73] Assignee: Xerox Corporation, Stamford, Conn.

[21] Appl. No.: 08/295,122

[22] Filed: Aug. 24, 1994

[51] Int. Cl.$^7$ .............................. H04N 1/028; H04N 1/19; H04N 1/40
[52] U.S. Cl. ............................................ 358/446; 358/483
[58] Field of Search ...................................... 358/406, 482, 358/483, 461, 446; 348/223, 251; 382/274

[56] References Cited

U.S. PATENT DOCUMENTS

| | | |
|---|---|---|
| 3,586,772 | 6/1971 | Hardin . |
| 3,673,322 | 6/1972 | Baxter . |
| 3,800,078 | 3/1974 | Cochran et al. . |
| 3,800,079 | 3/1974 | McNeil et al. . |
| 3,952,144 | 4/1976 | Kolker . |
| 4,216,503 | 8/1980 | Wiggins . |
| 4,555,732 | 11/1985 | Tuhro . |
| 4,660,082 | 4/1987 | Tomohisa et al. ....................... 358/406 |
| 4,734,762 | 3/1988 | Aoki et al. ................ 358/516 |
| 4,989,100 | 1/1991 | Ishima ..................... 358/483 |
| 5,267,053 | 11/1993 | Potucek et al. .......................... 358/406 |
| 5,282,024 | 1/1994 | Takei . |
| 5,283,632 | 2/1994 | Suzuki . |

OTHER PUBLICATIONS

P. Swart, "Contrast Amplifier," *IBM Technical Disclosure Bulletin*, vol. 14, No. 3, Aug. 1971, pp. 883–884.

I. Qureshi, "Automatic Gain Correction (AGC) Video Correction," *Xerox Disclosure Journal*, vol. 18, No. 1, Jan./Feb. 1993 (pp. 75–76).

*Primary Examiner*—Scott Rogers

[57] ABSTRACT

The present invention is a method of compensating for the offset present in image signals produced by an image processing apparatus, and more particularly to accurately characterizing the offset, gain and higher order responses of image sensing elements to enable correction thereof in an image sensing device or scanner. The method utilizes intermediate (grey) reflectance targets to measure the response of each sensor element and then, using the measured responses, fits a characteristic curve to the responses to calculate the response of the sensor element, including a zero reflectance situation, to characterize an accurate offset level, gain, and higher order response for the sensor. Moreover, additional reflectance targets and response may be employed so as to enable the characterization of image sensing elements exhibiting non-linear responses to linearly increasing light intensities.

18 Claims, 6 Drawing Sheets

METHOD FOR DETERMINING OFFSET AND GAIN CORRECTION FOR A LIGHT SENSITIVE SENSOR

This invention relates generally to a method for characterizing the dark offset bias and gain present in image signals produced by an image processing apparatus, and more particularly to accurately characterizing the dark offset voltage and gain in an image pick-up device or scanner thereby allowing compensation for the offset and gain characteristics in a single channel of a communication path utilized to transfer video or image data in the form of electrical signals.

BACKGROUND AND SUMMARY OF THE INVENTION

A problem prevalent in image scanning or digitizing systems is the requirement for a calibration operation in order to correct for non-uniformities therein prior to use. Generally, in beam scanning systems and plural element scanning systems, such as charge-coupled devices (CCDs), the sensor(s) must be calibrated. Calibration of a sensor offset is directed to determining the level of the signal in response to reflective or non-reflective regions of the document, for example a black region in a black-and-white document. Calibration also is directed to characterizing the gain of the sensor over a range of reflectances so as to adequately adjust any amplification of the signal to maximize the dynamic range thereof.

In systems employing plural element scanning devices, such as charge-coupled devices, for viewing by raster scanning an original, the output signal produced by the CCD includes a potential attributable to the inherent operating characteristics of the CCD. To restore the image output signal of the CCD to a true or absolute value, the potential derived from the CCD, referred to as the offset potential or signal, must be removed from the image signal. However, if the offset signal that is removed is greater or less than the actual offset signal, a noticeable aberration or distortion in the image output signal may result Since the operating characteristics of a CCD often vary widely from one CCD to another and even vary from time to time for the same CCD or for different integration rates, the accurate determination of the offset signal to be removed is often difficult. The problem is further complicated in systems where multiple CCDs are employed. Moreover, the responses of CCD sensors have commonly assumed to be linear so as to enable the characterization of the response as a first-order function.

To address the offset characterization problem, sensor offset calibration is often accomplished using one of two methods. In a first method, the offset level is determined by measuring the output signal level of the sensor when no exposure light is provided. Unfortunately, this no-light method does not account for stray light that may be present within the exposure cavity and can result in significant errors during offset calibration of the sensor. A second method employs a black calibration target that is exposed using the exposure light source used during normal scanning. This method is employed, for example, by the Xerox® DocuTech® Production Publisher scanner. When the sensor is exposed to light reflected from the black calibration target the offset level is determined by measuring the output signal level of the sensor.

Gain, on the other hand, is commonly characterized by measuring a second output signal level of the sensor when exposure light is provided and reflected off a white calibration target, having a known reflectance, and then comparing the first and second output signals relative to the known difference between the reflectance of the black and white calibration targets. This general method is employed, for example, in the Xerox® 7650 ProImager®. Unfortunately, characterization of sensors exhibiting non-linear responses is generally avoided by specifying CCDs with highly linear responses.

Heretofore, various apparatus and methods have been developed to address the sensor characterization problem, some of which are described in the following disclosures which may be relevant:

U.S. Pat. No. 3,586,772 to Hardin, issued Jun. 22, 1971, discloses an optical character reader which employs a clipping level determined as a function of black and white peaks detected during a normalization scan.

U.S. Pat. No. 3,673,322 to Baxter, issued Jun. 27, 1972, teaches a facsimile transmission system having an optical sensor for generating electrical signals in response to the amount of light directed onto it. A rotatable drum used to hold the document includes a highly reflective metal strip which guarantees a maximum white signal is produced once during each revolution. The signal output for transmission varies from a maximum positive level for white to a maximum negative level for black and is determined by the document region being scanned.

U.S. Pat. No. 3,800,078 to Cochran et al., issued Mar. 26, 1974, teaches a digitally compensated scanning system wherein a clear band of background, to compensate for photodiode sensitivity, is assured by providing a suitable margin along the top of a document being scanned. A sensitivity and illumination variance signal is generated and converted for each photodiode in the array, stored in memory as a digitized value, and then used to provide corrected video signals.

U.S. Pat. No. 3,800,079 to McNeil et al., issued Mar. 26, 1974, discloses a scanning system where photodiode sensitivity and illumination variance signals are removed to provide a corrected video information signal.

U.S. Pat. No. 3,952,144 to Kolker, issued Apr. 20, 1976, teaches a device which performs calibration once every predetermined number of scans. Kolker discloses that a facsimile transmitter makes a preliminary calibrating scan in which the transmitter sequentially scans a known black area and a known white area. An automatic background and contrast control unit stores a first sample of the uncorrected video signal which represents the scanned black area and stores a second sample of the uncorrected video signal which represents the scanned white area. During subsequent scanning, the automatic background and contrast control unit continually produces voltages representing the stored black and white samples and uses these voltages to correct the video signal received during the scanning of the document.

U.S. Pat. No. 4,216,503 to Wiggins, issued Aug. 5, 1980, teaches a device which proposes to correct gain and offset drift due to changes in the operating characteristics of a CCD. The patent discloses a system where dark and light level signals are isolated and processed by a microprocessor unit in accordance with a preestablished routine to provide an offset potential and gain multiplicand. The determined offset potential and gain multiplicand are used to remove the offset and set a signal gain for the next succeeding line of image signals. The process is then repeated for each line of image signals to be output from the CCD.

U.S. Pat. No. 4,555,732 to Tuhro, issued Nov. 26, 1985, is another example of a device that corrects for offset and gain drift. Tuhro discloses an image sensor correction system which maintains the offset voltages in the shift registers of a multi-channel image sensor substantially equal. U.S. Pat. No. 4,555,732 discloses that a pair of control gates permits sampling the current offset voltages in the shift register of each channel to provide an adjusted potential for balancing any differences between the shift registers. Specifically described is a device that compares the various offsets of a plurality of shift registers and determines a single offset potential to be applied to each shift register according to the comparison.

U.S. Pat. No. 5,282,024 to Takei, issued Jan. 25, 1994, teaches a white balance correction device for use in an image sensing apparatus such as a video camera. The device includes a gain control circuit that controls the gain of a color signal output from an image sensor. A similar white balance adjusting circuit is disclosed in U.S. Pat. No. 5,283,632 to Suzuki et al., issued Feb. 1, 1994.

P. Swart teaches in the *IBM Technical Disclosure Bulletin*, Vol. 14, No. 3, August 1971, a "Contrast Amplifier" that operates based upon a peak white voltage from the document background and a peak black voltage determined when the scanner is in an off mode.

I. Qureshi discloses, in the *Xerox Disclosure Journal*, Vol. 18, No. 1, January/February 1993 (pp. 75–76) an "Automatic Gain Correction (AGC) Video Correction" that compensates for component variations in the raster input scanner.

These various methods may be unable to reliably and precisely correct for offset characteristics and non-linear sensor responses. Moreover, with the recent development of full-width array systems, the drift changes in the fast scan direction become more prevalent, notwithstanding the system being used; i.e., platen scan or constant velocity transport. This is due to the fact that the full width arrays are typically made of several smaller arrays joined together in a butted or staggered manner. The need for a more precise offset correction method has led to the method of offset correction and higher order response characterization that is the subject matter of the present invention.

In accordance with the present invention, there is provided a method for determining an offset correction level for a light sensitive sensor used to record the intensity of exposure light reflected from the surface of a document, comprising the steps of: measuring the sensor response when the sensor is exposed to light reflected from a first target having a first reflectance level; measuring the sensor response when the sensor is exposed to light reflected from a second target, the second target having a second reflectance level greater than the first reflectance level; and calculating, as a function of the sensor response to the first target and the sensor response to the second target and the reflectances of the first and second targets, the response of the sensor to light reflected from a zero reflectance target, and thereby enabling the calculated response to be used as the offset correction level for the sensor.

In accordance with another aspect of the present invention, there is provided a method for determining a gain correction factor and at least one higher order correction factor for a light sensitive sensor used to record the intensity of exposure light reflected from the surface of a document, comprising the steps of: measuring the sensor response when the sensor is exposed to light reflected from a first target having a first reflectance; measuring the sensor response when the sensor is exposed to light reflected from a second target, the second target having a second reflectance greater than the first reflectance; measuring the sensor response when the sensor is exposed to light reflected from a third target, the third target having a third reflectance greater than the first reflectance and less than the second reflectance; and calculating, as a function of the sensor response to the first target, the second target and the third target and the reflectances of the first, second and third targets, a gain of the sensor, and a higher order correction factor, thereby enabling the calculated response to be used as the gain correction factor for the sensor while further compensating for any non-linear sensor response through the use of the higher order correction factor.

In accordance with yet another aspect of the present invention, there is provided a method for determining an offset correction level and a higher order correction factor for a non-linear light sensitive sensor used to record the intensity of exposure light reflected from the surface of a document, comprising the steps of: measuring the sensor response when the sensor is exposed to light reflected from a first target having a first reflectance level; measuring the sensor response when the sensor is exposed to light reflected from a second target, the second target having a second reflectance level greater than the first reflectance level; measuring the sensor response when the sensor is exposed to light reflected from a third target, the third target having a third reflectance greater than the first reflectance and less than the second reflectance; calculating, as a function of the sensor response to the first target, the second target and the third target and the reflectances of the first, second and third targets, the response of the sensor to light reflected from a zero reflectance target and thereby enabling the calculated response to be used as the offset correction level for the sensor; and characterizing, as a function of the sensor response to the first target, the second target and the third target and the reflectances of the first, second and third targets, a higher order response of the sensor and thereby enabling the characterized response to be used as the higher order correction factor for the non-linear sensor.

In accordance with another aspect of the present invention, there is provided a method for determining offset correction levels for a plurality of light sensitive sensors in a scanning array used to record the intensity of exposure light reflected from the surface of a document, comprising the steps of:

(a) measuring the response for each of the sensors when exposed to light reflected from a first target having a first, non-zero reflectance level;

(b) storing values representing the magnitude of the sensor responses to the first target in a plurality of first calibration memory locations, each first calibration memory location corresponding to a unique sensor;

(c) measuring the response for each of the sensors when exposed to light reflected from a second target, the second target having a second reflectance level greater than the first reflectance level;

(d) storing values representing the magnitude of the sensor response to the second target in a plurality of second calibration memory locations, each second calibration memory location corresponding to a unique sensor; and (e) calculating, as a function of associated sensor responses stored in the first and second calibration memory locations and the reflectances of the first and second targets, the response of each of the plurality of sensors to light reflected from a zero reflectance target and using the calculated responses as the offset correction levels for each of the sensors.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 1:
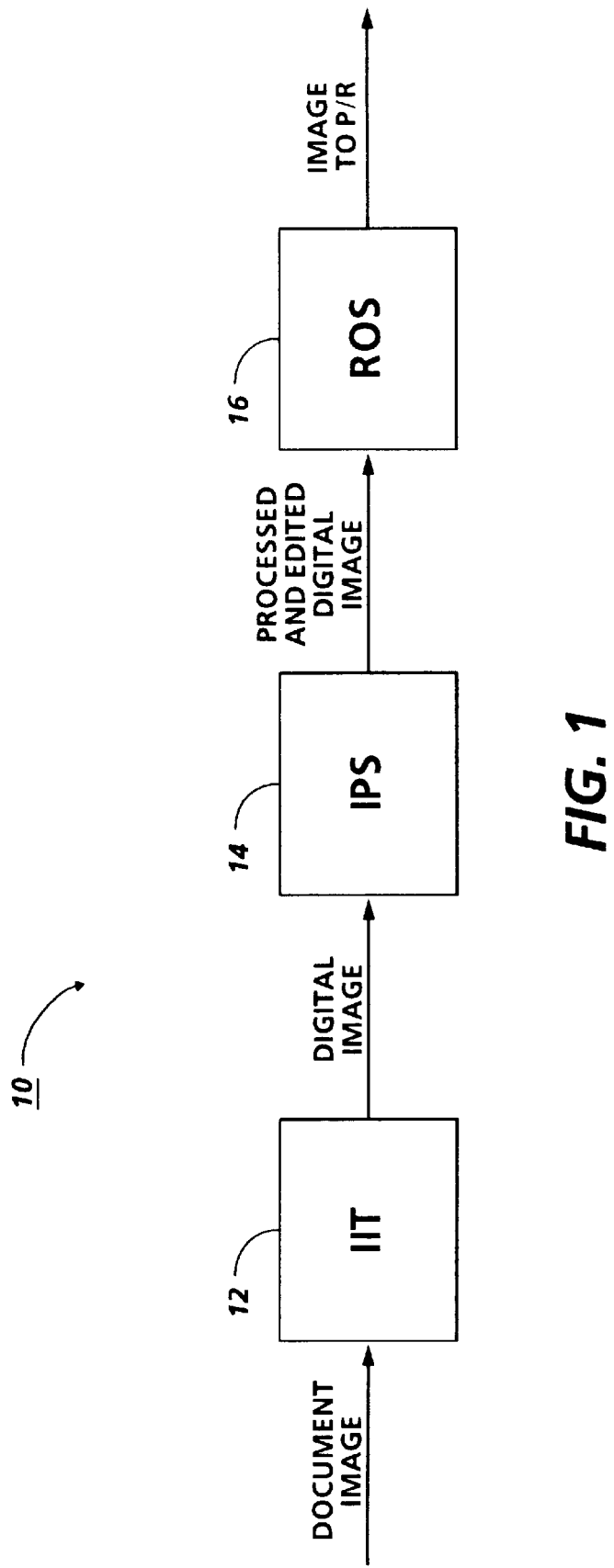
FIG. 1 is a block diagram illustrating the primary components of a digital imaging system.

For a general understanding of the present invention, reference is made to the drawings. In the drawings, like reference numerals have been used throughout to designate identical elements. FIG. 1 shows a digital imaging system 10, for example, a Xerox® DocuTech® Production Publisher, which includes an Image Input Terminal (IIT) 12 such as a raster image scanner for document image input. The IIT may be a carriage-type (e.g., a Xerox® 7650 Pro Imager®), continuous velocity, or full-page raster scanner which employs a charge coupled device (CCD) or page-width array of light sensitive elements to convert light reflected from the document to a plurality of electrical signals, in a raster format. At the operating speeds of high-speed IITs, individual raster image elements within the CCD, referred to as photosites, are employed to produce video signals at a rate of about 30 MHz; each video signal representing an associated pixel of the document as a greyscale level within a predetermined range. It should be noted that greyscale includes not only the continuum between black and white, but the relative intensities of reflected light for any color separation, for example those in a multi-color IIT.

In order to accurately represent the greyscale level of each pixel, the individual raster image elements of the CCD are initially calibrated and all subsequent video signals produced by the image elements are corrected to compensate for any variation between individual elements. The correction of the video signals is typically accomplished in two parts, specifically referred to as offset and gain corrections. Offset correction, is an adjustment to the video signal to compensate for the magnitude of the signal while imaging a "black," or zero reflectance, region of the document. Gain correction scales or amplifies the offset corrected signal so that the video signal is at a maximum magnitude when imaging a "white," or absolute reflectance, region of the document. As described herein, a black and white scanning paradigm will be used for simplicity, however, the present invention has application to digital imaging systems that generate a plurality of digital signals representing color separations of the document image as well.

Also included in the digital imaging system are the Image Processing System (IPS) 14 and the Raster Output Scanner (ROS) subsystem 16. IPS 14 performs the processing and editing operations that may be carried out on the digitized image supplied thereto. Such operations include, but are not limited to, thresholding of the digitized image to produce a binary representation, halftone screening, error diffusion, color correction and under color removal. Once processed, the digital image is then transferred to ROS 16 where, for example, a laser or similar exposure apparatus is used to expose a photoresponsive (P/R) surface to create the latent image for subsequent development and output.

Figure 2:
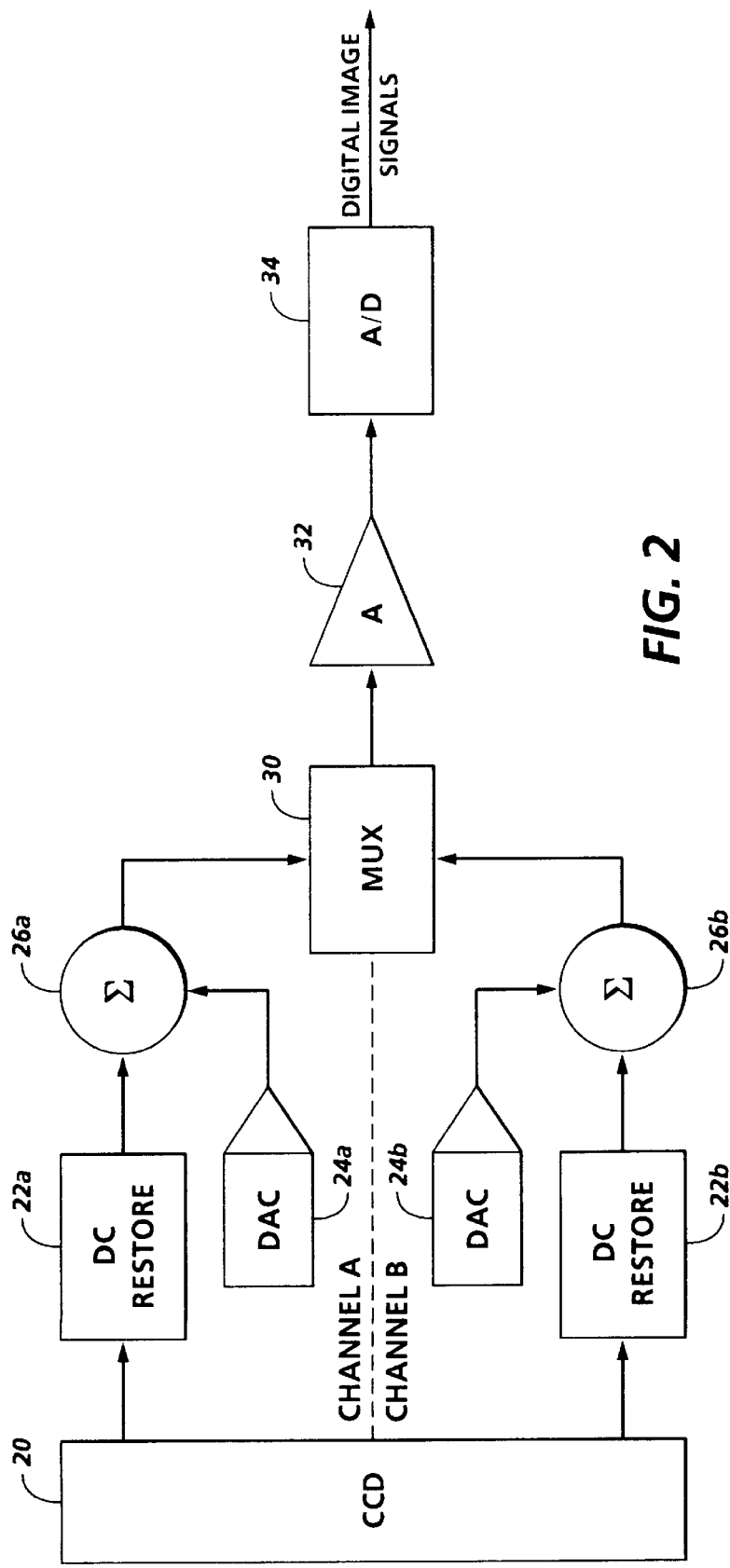
FIGS. 2 and 3 are schematic block diagrams illustrating the principal components in a two-channel image input terminal.

FIG. 2 is a block diagram of a simplified video pre-processing circuit that may be employed within IIT 12 to practice the present invention. As shown therein, CCD 20 preferably contains a plurality of light sensitive elements, referred to as sensors or photosites, that measure the intensity of light impinging thereon. As is well-known, each sensor is illuminated by light reflected from a portion of a document being scanned (not shown), and focussed on the photosite by imaging optics (not shown). Because the light being sensed by the document is reflected from the surface of the document, the photosites are measuring the reflectance of regions of the document. This measurement is preferably accomplished simultaneously for a number of scanlines as the document and CCD move relative to one another.

Each photosite or sensor within the CCD generates a voltage signal corresponding to the sensed document reflectance. Subsequently, the sensor produced voltages are shifted out of the CCD sequentially on two channels (A and B). Typically, the CCD signal is on the order of −0.2 volts and rides on a DC bias voltage of approximately +4.0 volts. DC Restore circuits 22a and 22b remove the DC bias voltage so as to output the equivalent of the CCD sensor output, in the range of 0 to −0.2 volts. The offset correction factor, including any channel offset correction, is generated by DACs 24a and 24b, and is added by analog summation blocks or adders (e) 26a and 26b. Thus, the DC restored, or offset corrected, signal levels output from adders 26a,b have equivalent base levels in response to absolute black reflectance as will be described in more detail with respect to FIGS. 3–6. Subsequently, the restored and offset corrected signals are supplied to MUX 30 where they are stitched back together to form a single stream of pixel signals. The serial stream of analog pixel signals is then amplified at amplifier 32 to produce the voltage and current levels needed by A/D converter 34 which transforms the analog pixel signals to digital signals.

Figure 3:
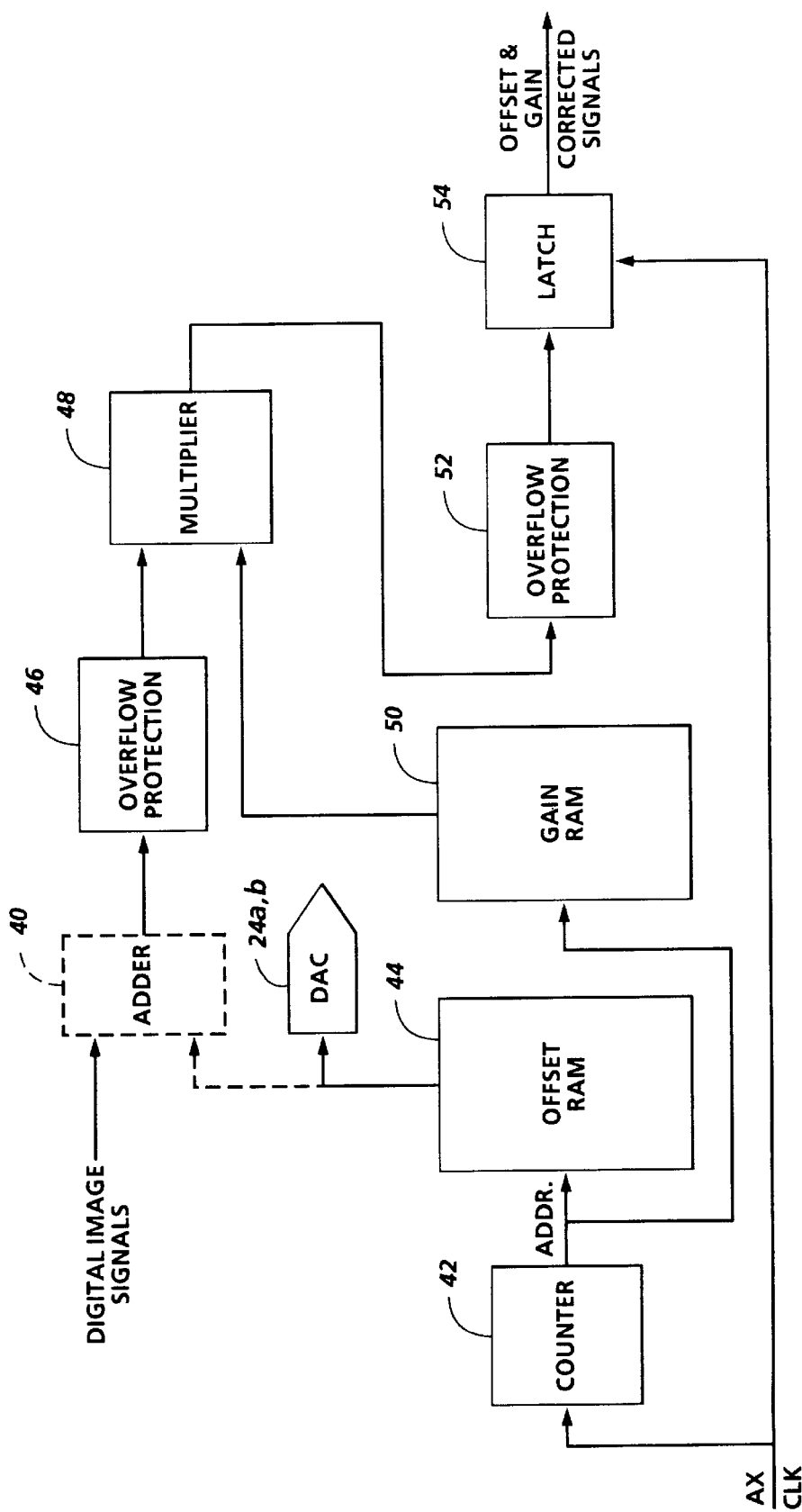

As an alternative to the analog offset correction described above, the DACs 24a,b may be employed only to accomplish channel-to-channel offset correction. In that case, the digital signal associated with each individual photosite may be subsequently processed to accomplish offset correction as illustrated generally by optional adder 40 of FIG. 3. As shown in FIG. 3, the digital input signals from A/D converter 34 may be applied to adder 40 where they would be added to offset correction signals provided by Offset RAM 44 in response to addresses generated by a pixel clock driven Counter such as that indicated by reference numeral 42.

In either the analog or digital correction scheme, once the digital signal is added to the digital offset value, the result is checked for overflow at circuit block 46. Subsequently, the offset-corrected signal is passed to multiplier 48 where it is multiplied by a digital value stored in Gain RAM 50, again, the gain multiplier being selected as a function of the output of counter 42. It should be noted that the simplified diagram does not take into account time delays of the various circuits and that it may be necessary to include latches or delay lines therein in order to account for such delays. Once the digital signal has been corrected for offset and multiplied by the gain factor, it is again checked for overflow at circuit block 52 before being passed to latch 54 where it is held during a period of time determined by a pixel clocking signal, line 56.

Figure 4:
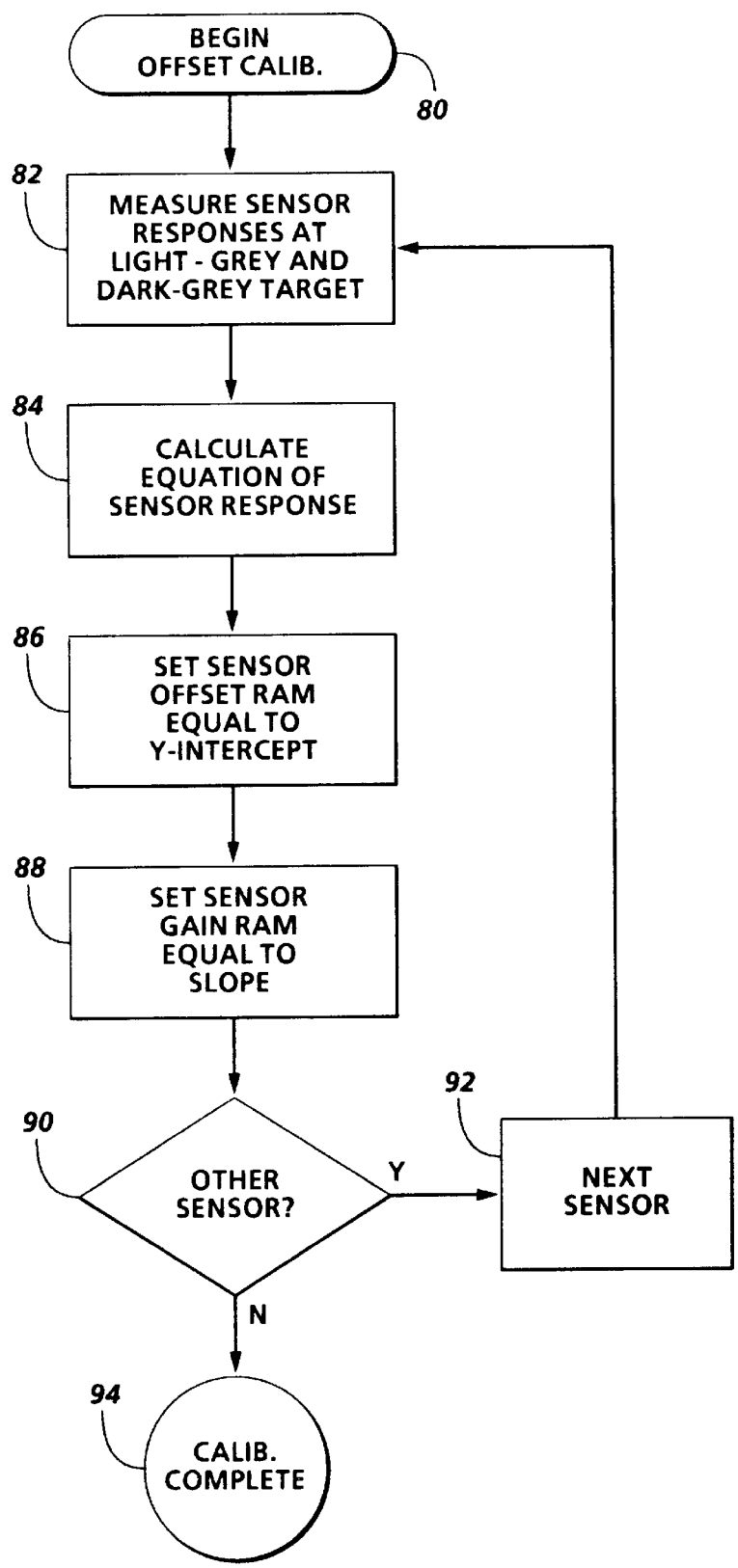
FIG. 4 is a flowchart illustrating the steps of the calibration operation carried out in accordance with the present invention.
Figure 5:
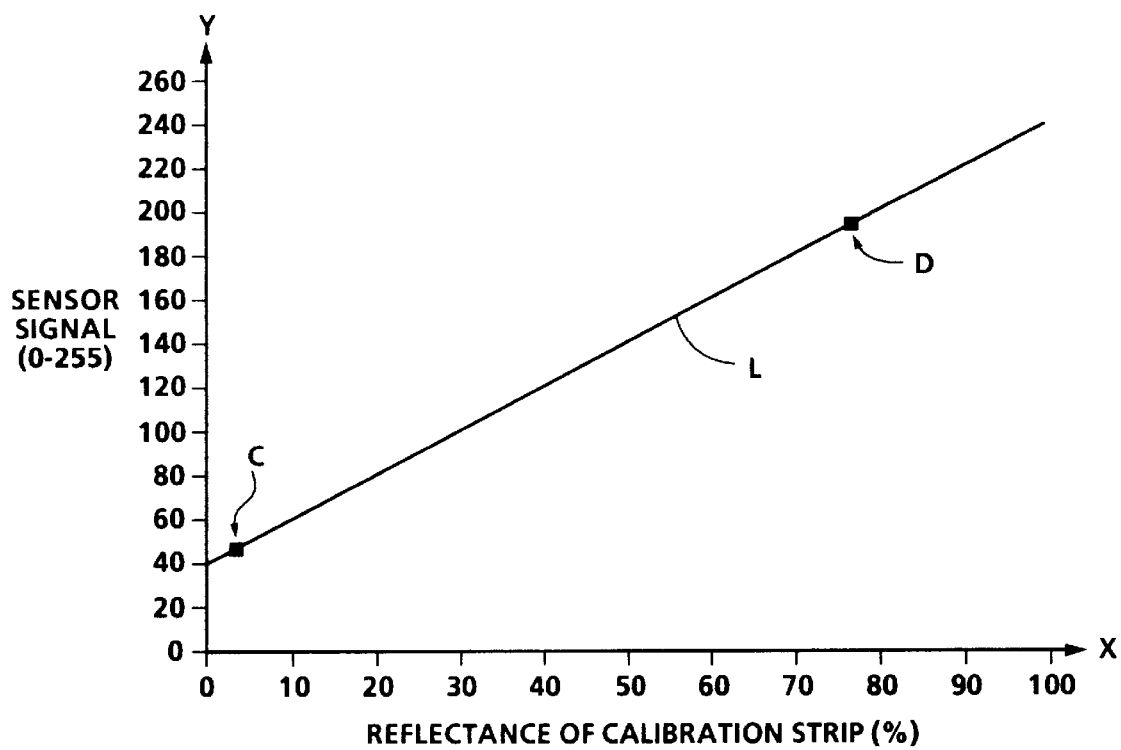
FIGS. 5 and 6 are graphical examples of the operations carried out in FIG. 4.

To determine the calibration values (including offset and gain correction) stored in Offset RAM 44, the process steps of FIG. 4 are implemented. A graphical representation of the process is also depicted in FIG. 5. As previously described, the intent of the offset calibration operation is to enable the digital image signals to be corrected for an offset signal level that is produced by the CCD sensor when it is exposed to a zero percent reflectance location on a document. The present invention calibrates the sensor elements of the CCD or similar raster scanning device not by measuring the response to light reflected from a 0% reflectance target, but by measuring the response of the photosites at two reflectance levels and then deriving the offset of a "black" signal level from the equation of a line or curve L passing through the measured calibration points as will be described.

Initially, the response of the sensor to light reflected from a dark-grey target is measured and stored as a digital value in memory, as represented by step 82. Although a range of target reflectance levels of from about 1% reflectance to about 10% may be used, the target dark-grey level is preferably about 2% reflectance. This flexibility enables the use of commonly available reflectance targets, while avoiding the need for costly absolute black or white reflectance targets. Once the resulting digital signal for the sensor is obtained, it may be temporarily stored in calibration RAM (not shown) for subsequent processing. For example, the sensor may have output a digital signal level having a magnitude of approximately 43, as indicated by point C on the graph of FIG. 5. As depicted by step 84, the response of the sensor to a light-grey target is also measured and recorded. Here again, the reflectance of the light-grey target may be on the order of 70% to 90%, and is preferably about 77%. As before, the resulting digital signal output by the sensor, a digital value of approximately 192, may also be stored in calibration RAM (not shown) for subsequent processing.

Once the light-grey and dark-grey sensor response signal levels have been measured and recorded, a sensor response curve is fit to the two points. As illustrated in FIG. 5, the response curve may be assumed to be a linear response, making the determination of the curve straight-forward using the line equation:

$$y = mx + b \quad (1)$$

where b is the y-intercept and m is the slope defined by the equation:

$$m = \frac{y_D - y_C}{x_D - x_C}, \quad (2)$$

and $$b = y_C - mx_C \quad (3)$$

Solving the equations for the y-intercept in the straight-line example, using the points identified in FIG. 5, yields a slope (m) of about 1.987, and a y-intercept (b) of approximately 39.027. Thus the digital level of sensor output expected as a result of light reflected from a zero percent reflectance target, or the offset of the sensor, is determined to be approximately 39, equivalent to the y-intercept illustrated graphically in FIG. 5. Similarly, the slope or gain, m, is determined in accordance with Equation 2. The foregoing calculations, having been carried out in step 84 of FIG. 4, allow the offset gain values to be stored in the sensor offset and gain RAM, steps 86 and 88 respectively, for subsequent use while digitizing documents as previously described with respect to FIG. 3. As depicted in FIG. 4 by steps 90 and 92, the process is repeated for each of the plurality of sensor elements in the scanning array or CCD. Once the process steps shown in FIG. 4 are completed, an offset and gain level will have been calculated for each element in the CCD sensor array.

Figure 6:
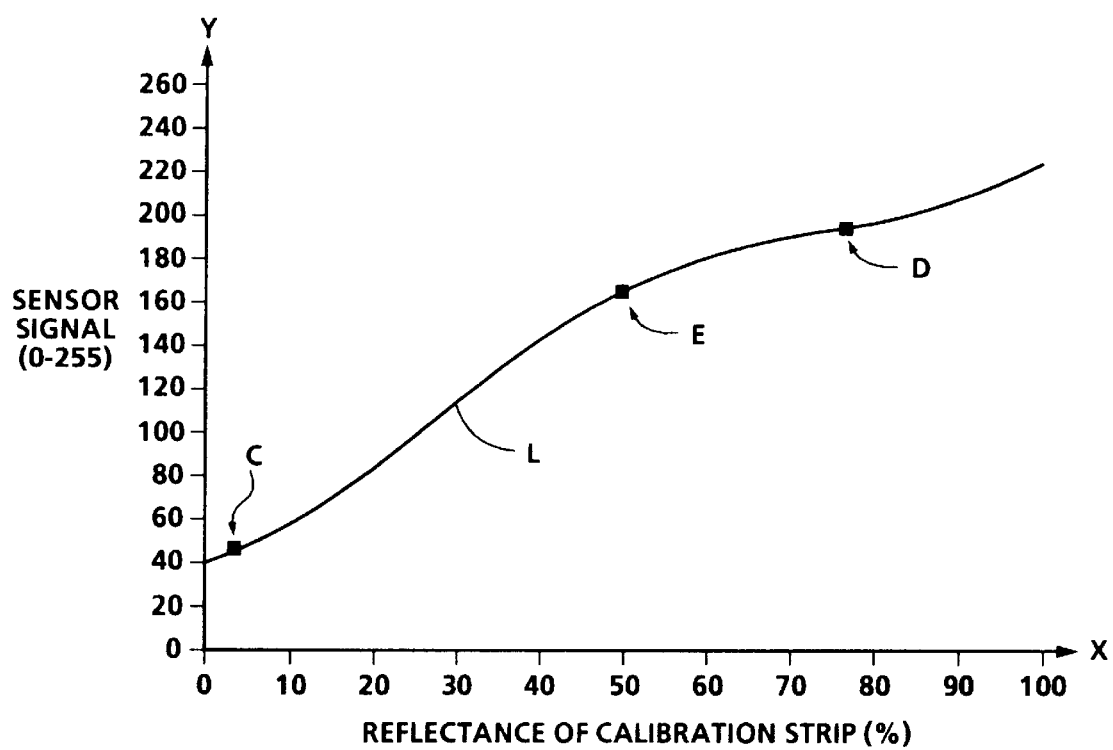

Although previously described as an operation suitable to determine the y-intercept of a straight line, it will be appreciated that other curve fitting operations may be used in order to accurately represent the voltage output characteristics of the sensor or photosite in response to no or low reflected light situations should it be determined that the response curve of the CCD sensors is non-linear in this region. FIG. 6 is an illustrative example of the curve fitting operation, where the response of the sensor may be more accurately approximated by a curve L. In such a situation, equation (1) would be modified to include one or more higher order correction factors ($a_n x^{n+1}$) as shown in the following equation:

$$y = mx + b + a_1 x^2 + a_2 x^3 + \quad (4)$$

where n additional calibration points can be employed to produce an n-dimensional polynomial curve. The addition of each higher order correction factor to Equation 4 requires the determination of an additional point along curve L. For example, in order to determine the value of a1 in Equation 4, it would be necessary to collect data for an intermediate grey reflectance, say at approximately fifty percent reflectance, as illustrated by point E in FIG. 6. Use of the additional calibration information would enable the characterization of non-linear sensor responses using higher order terms.

In recapitulation, the present invention is a method of compensating for the offset present in image signals produced by an image processing apparatus, and more particularly to accurately characterizing the offset, gain and higher order responses of image sensing elements to enable correction thereof in an image sensing device or scanner. The method utilizes intermediate (grey) reflectance targets to measure the response of each sensor element and then, using the measured responses, fits a characteristic curve to the responses to calculate the response of the sensor element, including a zero reflectance situation, to characterize an accurate offset level, gain and the higher order response for the sensor. Moreover, additional reflectance targets and response may be employed so as to enable the characterization of image sensing elements exhibiting non-linear responses to linearly increasing light intensities.

It is, therefore, apparent that there has been provided, in accordance with the present invention, a method for accurately determining the dark offset level of image sensing elements to enable correction thereof in an image pick-up device or scanner, and a method for further characterizing the responses of such elements using higher order correction factors. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for determining an offset correction level for a light sensitive sensor used to record the intensity of exposure light reflected from the surface of a document, comprising the steps of:

measuring the sensor response when the sensor is exposed to light reflected from a first target having a first, non-zero reflectance level;

measuring the sensor response when the sensor is exposed to light reflected from a second target, the second target having a second reflectance level greater than the first reflectance level; and calculating, only as a function of the sensor response to the first target and the sensor response to the second target and the reflectances of the first and second targets, the response of the sensor to light reflected from a zero reflectance target, and thereby enabling the calculated response to be used as the offset correction level for the sensor.

2. The method of claim 1, further comprising the steps of:

storing the magnitude of the sensor response to the first target in a first calibration memory location;

storing the magnitude of the sensor response to the second target in a second calibration memory location; and retrieving the magnitudes stored in the first and second calibration memory, said calculating step using the magnitudes retrieved from said first calibration memory location and said second calibration memory location for calculating the zero reflectance response of the sensor.

3. The method of claim 1, wherein the step of measuring the sensor response when exposed to light reflected from a first target comprises the step of recording the voltage level output by the sensor in response to exposure light reflected from the surface of a target having a reflectance of at least 1 percent.

4. The method of claim 3, wherein the step of measuring the sensor response when exposed to light reflected from a second target comprises the step of recording the voltage level output by the sensor in response to exposure light reflected from the surface of a target having a reflectance less than 90 percent.

5. A method for determining an offset correction level for a light sensitive sensor used to record the intensity of exposure light reflected from the surface of a document, comprising the steps of:

measuring the sensor response when the sensor is exposed to light reflected from a first target having a first, non-zero reflectance level;

measuring the sensor response when the sensor is exposed to light reflected from a second target, the second target having a second reflectance level greater than the first reflectance level;

calculating, as a function of the sensor response to the first target and the sensor response to the second target and the reflectances of the first and second targets, the response of tne sensor to light reflected from a zero reflectance target, and thereby enabling the calculated response to be used as the offset correction level for the sensor, including defining a first sensor response point as a function of the first target reflectance and the first sensor response, defining a second sensor response point as a function of the second target reflectance and the second sensor response, fitting a sensor response curve to the first and second sensor response points, and approximating, from the sensor response curve, the response of the sensor to light reflected from a zero percent reflectance target.

6. The method of claim 5, wherein the sensor response curve is a straight line response curve and the step of approximating the response of the sensor consists of calculating a y-intercept of the line.

7. A method for determining a gain correction factor and at least one higher order correction factor for a light sensitive sensor used to record the intensity of exposure light reflected from the surface of a document, comprising the steps of:

measuring the sensor response when the sensor is exposed to light reflected from a first target having a first reflectance;

measuring the sensor response when the sensor is exposed to light reflected from a second target, the second target having a second reflectance greater than the first reflectance;

measuring the sensor response when the sensor is exposed to light reflected from a third target, the third target having a third reflectance greater than the first reflectance and less than the second reflectance; and calculating, as a function of the sensor response to the first target, the second target and the third target and the reflectances of the first, second and third targets, a gain of the sensor, and a higher order correction factor, thereby enabling the calculated response to be used as the gain correction factor for the sensor while further compensating for any non-linear sensor response through the use of the higher order correction factor.

8. The method of claim 7, further comprising the steps of:

storing the magnitude of the sensor response to the first target in a first calibration memory location;

storing the magnitude of the sensor response to the second target in a second calibration memory location;

storing the magnitude of the sensor response to the third target in a third calibration memory location; and retrieving the magnitudes stored in the first, second and third calibration memory locations, said calculating step using the magnitudes retrieved from said first, second and third calibration memory locations and for calculating the gain correction factor of the sensor.

9. The method of claim 7, wherein the step of measuring the sensor response when exposed to light reflected from a first target comprises the step of recording the voltage level output by the sensor in response to exposure light reflected from the surface of a target having a reflectance of at least 1 percent.

10. The method of claim 9, wherein the step of measuring the sensor response when exposed to light reflected from a second target comprises the step of recording the voltage level output by the sensor in response to exposure light reflected from the surface of a target having a reflectance less than 90 percent.

11. The method of claim 7, wherein the step of calculating a gain of the sensor comprises the steps of:

defining a first sensor response point as a function of the first target reflectance and the first sensor response;

defining a second sensor response point as a function of the second target reflectance and the second sensor response;

defining a third sensor response point as a function of the third target reflectance and the third sensor response;

fitting a sensor response curve to the first, second and third sensor response points; and approximating, from the sensor response curve, the gain of the sensor at a plurality of points on the sensor response curve.

12. A method for determining an offset correction level and a higher order correction factor for a non-linear light sensitive sensor used to record the intensity of exposure light reflected from the surface of a document, comprising the steps of:

measuring the sensor response when the sensor is exposed to light reflected from a first target having a first reflectance level;

measuring the sensor response when the sensor is exposed to light reflected from a second target, the second target having a second reflectance level greater than the first reflectance level;

measuring the sensor response when the sensor is exposed to light reflected from a third target, the third target having a third reflectance greater than the first reflectance and less than the second reflectance;

calculating, as a function of the sensor response to the first target, the second target and the third target and the reflectances of the first, second and third targets, the response of the sensor to light reflected from a zero reflectance target and thereby enabling the calculated response to be used as the offset correction level for the sensor; and characterizing, as a function of the sensor response to the first target, the second target and the third target and the reflectances of the first, second and third targets, a higher order response of the sensor and thereby enabling the characterized response to be used as the higher order correction factor for the non-linear sensor.

13. The method of claim 12, further comprising the steps of:

storing the magnitude of the sensor response to the first target in a first calibration memory location;

storing the magnitude of the sensor response to the second target in a second calibration memory location;

storing the magnitude of the sensor response to the third target in a third calibration memory location; and retrieving the magnitudes stored in the first, second and third calibration memory locations, said gain correction factor calculating step using the magnitudes retrieved from said first, second and third calibration memory locations and for calculating the higher order correction factor of the sensor.

14. The method of claim 12, further comprising the steps of:

storing the magnitude of the sensor response to the first target in a first calibration memory location;

storing the magnitude of the sensor response to the second target in a second calibration memory location; and retrieving the magnitudes stored in the first and second calibration memory locations, said response calculating step using the magnitudes retrieved from said first calibration memory location and said second calibration memory location for calculating the zero reflectance response of the sensor.

15. The method of claim 12, wherein the step of measuring the sensor response when exposed to light reflected from a first target comprises the step of recording the voltage level output by the sensor in response to exposure light reflected from the surface of a target having a reflectance of at least 1 percent.

16. The method of claim 15, wherein the step of measuring the sensor response when exposed to light reflected from a second target comprises the step of recording the voltage level output by the sensor in response to exposure light reflected from the surface of a target having a reflectance less than 90 percent.

17. The method of claim 12, wherein the step of characterizing a higher order response of the sensor comprises the steps of:

defining a first sensor response point as a function of the first target reflectance and the first sensor response;

defining a second sensor response point as a function of the second target reflectance and the second sensor response;

defining a third sensor response point as a function of the third target reflectance and the third sensor response;

fitting a sensor response curve to the first, second and third sensor response points; and approximating, from the sensor response curve, the gain of the sensor at a plurality of points on the sensor response curve.

18. A method for determining offset correction levels for a plurality of light sensitive sensors in a scanning array used to record the intensity of exposure light reflected from the surface of a document, comprising the steps of:

(a) measuring the response for each of the sensors when exposed to light reflected from a first target having a first, non-zero reflectance level;

(b) storing values representing the magnitude of the sensor responses to the first target in a plurality of first calibration memory locations, each first calibration memory location corresponding to a unique sensor;

(c) measuring the response for each of the sensors when exposed to light reflected from a second target, the second target having a second reflectance level greater than the first reflectance level;

(d) storing values representing the magnitude of the sensor response to the second target in a plurality of second calibration memory locations, each second calibration memory location corresponding to a unique sensor; and (e) calculating, as a function of associated sensor responses stored in the first and second calibration memory locations and the reflectances of the first and second targets, the response of each of the plurality of sensors to light reflected from a zero reflectance target and using the calculated responses as the offset correction levels for each of the sensors.

* * * * *